(12) United States Patent
Anderson et al.

(10) Patent No.: US 7,573,241 B2
(45) Date of Patent: Aug. 11, 2009

(54) VEHICLE HAVING A BATTERY WITH MULTIPLE CELLS AND METHOD FOR OPERATING SUCH A BATTERY

(75) Inventors: Richard Anderson, Plymouth, MI (US); Bruce Blakemore, Plymouth, MI (US); Ted Miller, Milan, MI (US); Bob Taenaka, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 717 days.

(21) Appl. No.: 11/161,402

(22) Filed: Aug. 2, 2005

(65) Prior Publication Data

US 2007/0029971 A1 Feb. 8, 2007

(51) Int. Cl.
*H02J 7/00* (2006.01)

(52) U.S. Cl. ............... 320/133; 320/118; 320/130; 324/432; 324/433; 324/434; 702/63

(58) Field of Classification Search ........... 320/118, 320/130, 133, 155; 701/63; 324/432, 433, 324/434

See application file for complete search history.

(56) References Cited

U.S. PATENT DOCUMENTS

| | | | | |
|---|---|---|---|---|
| 4,564,798 A | * | 1/1986 | Young | 320/103 |
| 5,644,212 A | | 7/1997 | Takahashi | 320/6 |
| 5,869,950 A | | 2/1999 | Hoffman, Jr. et al. | 320/103 |
| 6,150,795 A | | 11/2000 | Kutkut et al. | 320/118 |
| 6,209,672 B1 | * | 4/2001 | Severinsky | 180/65.2 |
| 6,275,004 B1 | | 8/2001 | Tamai et al. | 320/118 |
| 6,321,150 B1 | | 11/2001 | Nitta | 701/29 |
| 6,456,043 B1 | | 9/2002 | Finger | 320/134 |
| 6,487,477 B1 | | 11/2002 | Woestman et al. | 96/125 |
| 6,612,386 B2 | | 9/2003 | Tamai et al. | 180/65 |
| 2002/0167296 A1 | * | 11/2002 | Nagata et al. | 320/155 |
| 2004/0135546 A1 | | 7/2004 | Chertok et al. | 320/119 |
| 2006/0267554 A1 | * | 11/2006 | Cargonja et al. | 320/130 |

* cited by examiner

*Primary Examiner*—Akm E Ullah
*Assistant Examiner*—Arun Williams
(74) *Attorney, Agent, or Firm*—David B. Kelley; Brooks Kushman P.C.

(57) ABSTRACT

A method for operating a battery having a plurality of battery cells includes determining when certain end of life criteria for the battery are met. A counter is incremented when the certain end of life criteria are met. The battery is rebalanced when it is determined that the end of life criteria are met, and the counter is not greater than a predetermined value. An end of life of the battery is indicated when it is determined that the end of life criteria are met, and the counter is greater than the predetermined value.

20 Claims, 2 Drawing Sheets

VEHICLE HAVING A BATTERY WITH MULTIPLE CELLS AND METHOD FOR OPERATING SUCH A BATTERY

BACKGROUND OF THE INVENTION

1. Field of the Invention

The present invention relates to a vehicle and a method for operating a battery in a vehicle.

2. Background Art

Batteries, such as traction batteries in hybrid electric vehicles (HEV's), have a finite life. A battery controller can be used to determine when the battery has reached its end of life, and further, to communicate this to the diagnostic system and the driver, and adjust output parameters to the rest of the vehicle control system accordingly. There may be a number of different ways to determine when a battery has reached the end of its life.

One such method for diagnosing the health of a battery is described in U.S. Pat. No. 6,456,043 (Finger). The method described in Finger includes charging a battery that is at least partially depleted, measuring the voltage after the battery has been charged, and comparing the measured voltage to an expected voltage. If the measured voltage falls within some expected voltage range, the battery is determined to be healthy.

One issue that must be addressed in developing a method for determining the end of a battery's life is how to reduce the likelihood of prematurely designating the battery at its end of life. For example, temporary environmental conditions, such as temperature, may have an impact on the output of the battery. Moreover, for a battery that is made up of a plurality of interconnected battery cells, an equalization or "rebalancing" process may need to be periodically performed in order to equalize the state of charge (SOC) across each of the cells. Otherwise, one or two weak cells in the group may provide a false indication that the battery itself is incapable of providing a desired output, and an end of life determination may be prematurely made.

Therefore, it would be desirable to have a method for managing a battery that included a robust end of life determination, such that the end of life determination was not premature, and "false positives" were avoided.

SUMMARY OF THE INVENTION

The present invention provides a robust method for determining the end of life of a battery in such away that false positives are reduced or eliminated.

The invention also provides a method for managing a battery having a plurality of battery cells. The method includes determining an output from the battery, determining at least one battery condition, and determining a relative time of occurrence for at least one past rebalance of the battery. The battery is rebalanced when the output from the battery is less than a predetermined battery output for a first predetermined period of time, the at least one battery condition matches a corresponding predetermined battery condition, and no rebalance has occurred for at least a second predetermined time period.

The invention further provides a method for managing a battery having a plurality of cells. The method includes determining when end of life criteria for the battery are met. A counter is incremented when it is determined that the end of life criteria for the battery are met. The battery is rebalanced when it is determined that the end of life criteria for the battery are met and the counter is not greater than a predetermined value. An end of life of the battery is indicated when it is determined that the end of life criteria for the battery are met and the counter is greater than the predetermined value.

The invention also provides a vehicle including an electric machine and a battery operable to provide power to the electric machine. The battery has a plurality of battery cells which are subject to periodic rebalancing to substantially equalize the SOC of each of the cells. A control system in communication with the battery includes at least one controller. The control system is configured to determine when end of life criteria for the battery are met, increment a counter when the end of life criteria for the battery are met, and rebalance the battery when the control system determines that the end of life criteria for the battery are met and the counter is not greater than a predetermined value. The control system is further configured to indicate an end of life of the battery when the control system determines that the end of life criteria for the battery are met and the counter is greater than the predetermined value.

DETAILED DESCRIPTION OF THE PREFERRED EMBODIMENT(S)

Figure 1:
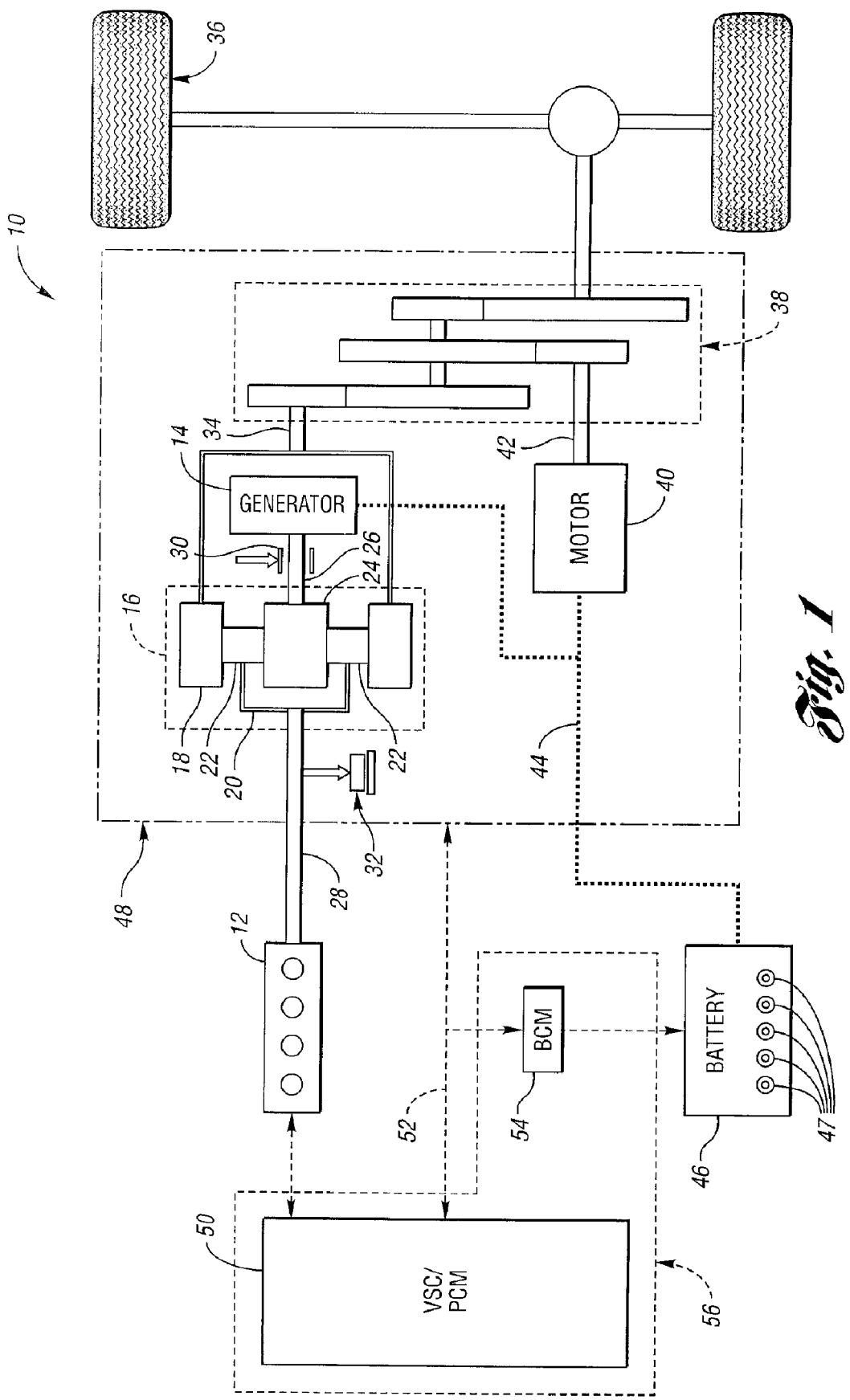
FIG. 1 is a schematic representation of an exemplary vehicle in accordance with the present invention.

FIG. 1 shows a schematic representation of a vehicle 10 in accordance with one embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. The battery 46 includes a plurality of battery cells 47 connected in series to provide the total output power of the battery 46. As the battery 46 provides power, for example, to the motor 40 to propel the vehicle 10, the SOC across the battery cells 47 may become unequal. Therefore, an equalization, or "rebalance", will be performed periodically on the battery 46 to substantially equalize the SOC of each of the battery cells 47.

One method of rebalancing the battery 46 is to provide a high level of charge to each of the battery cells 47. One effective method of providing this high level charge is to use a pulse charging technique, in which the charge is applied to the battery 46 for some time interval, and the charging pulse is removed for some time interval before being reapplied. Of course, any rebalancing method effective to achieve the desired result may be used.

As shown in FIG. 1, the motor 40, the generator 14, the planetary gear set 16, and a portion of the second gear set 38 may generally be referred to as a transaxle 48. The transaxle 48 is analogous to a transmission in a conventional vehicle. Thus, when a driver selects a particular gear, the transaxle 48 is appropriately controlled to provide that gear. To control the engine 12 and the components of the transaxle 48-e.g., the generator 14 and motor 40—a control system, including a controller 50, is provided. As shown in FIG. 1, the controller 50 is a combination vehicle system controller and powertrain control module (VSC/PCM). Although it is shown as a single hardware device, it may include multiple controllers in the form of multiple hardware devices, or multiple software controllers within one or more hardware devices.

A controller area network (CAN) 52 allows the VSC/PCM 50 to communicate with the transaxle 48 and a battery control module (BCM) 54. In the embodiment shown in FIG. 1, the VSC/PCM 50 and the BCM 54 are part of a control system 56; however, a control system in accordance with the present invention may include a single controller, or, as noted below, additional controllers. Just as the battery 46 has the BCM 54, other devices controlled by the VSC/PCM 50 may have their own controllers. For example, the transaxle 48 may include one or more controllers, such as a transaxle control module (TCM), configured to control specific components within the transaxle 48, such as the generator 14 and/or the motor 40. Some or all of these controllers may be a part of a control system, such as the control system 56.

The control system 56 is configured to implement a method in accordance with the present invention. In particular, the battery control module 54 is programmed with an algorithm for managing the battery 46. It is worth noting, however, that the algorithm or algorithms used could be programmed into controllers other than the BCM 54, and parts of such algorithm or algorithms could be programmed into multiple controllers which communicate with each other, for example, via the CAN 52.

Figure 2:
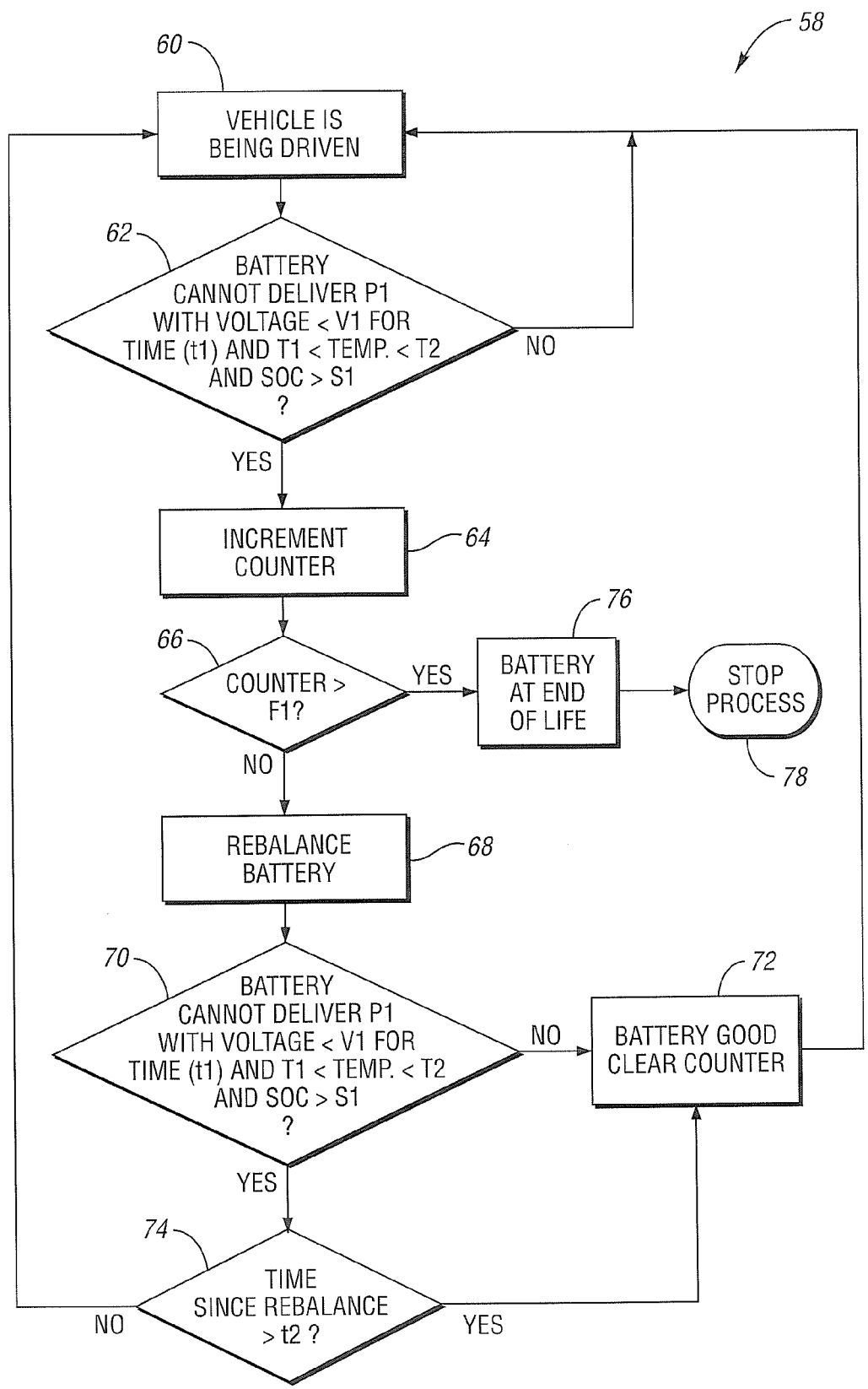
FIG. 2 is a flowchart illustrating a method of an embodiment of the present invention.

FIG. 2 shows a flowchart 58 illustrating a method in accordance with one embodiment of the present invention. At step 60, it is determined that the vehicle 10 is being driven. The method described in this embodiment requires that the vehicle 10 is operating, although other implementations in accordance with the present invention need not have such a requirement. At decision block 62, an output of the battery 46 is determined. Specifically, it is determined whether or not the battery 46 can output power at a predetermined power level (P1). If it is determined that the battery 46 is below the predetermined power output level (P1), it is further determined whether the battery power output remains below P1 for a first predetermined time period (t1). It is worth noting that although the output from the battery is power in this embodiment, other types of battery outputs could be used—e.g., voltage, current, etc.

The predetermined battery power output level (P1) can be set to any desired value, depending on the particular application and output requirements of the battery being used. For the battery 46 shown in FIG. 1, a value of P1 of 15 kilowatts (kW) provides a power level that is effective for implementing the battery management method illustrated in FIG. 2, since this is an approximate power required to start the engine 12 under normal conditions. The first predetermined time period (t1) can also be set to any desired level, and provides a way to ensure that a momentary drop in battery power output is not used as an indicator of a battery problem. For the battery 46 shown in FIG. 1, a value of t1 of one second may be conveniently used. Of course, the first predetermined time period (t1) can be set to zero, or even some very small value, as desired.

In addition to determining the battery power output, at least one battery condition is also determined. For example, in decision block 62, the battery voltage is determined, and compared with a first predetermined battery voltage (V1). For the battery 46 shown in FIG. 1, a value of V1 of 230 volts may be conveniently used. Specifically, at decision block 62, a determination is made as to whether the battery voltage is less than the voltage (V1). This helps to ensure that false positives are not encountered when determining whether the battery 46 is at its end of life. The voltage measured across the terminals of the battery 46 can be an indicator of the internal resistance. If the voltage is relatively high, for example, greater than the first predetermined voltage (V1), it is possible that the battery 46 is still capable of outputting power greater than P1, but for some reason is not putting out power at that level when the power output is measured.

Another battery condition that is determined in decision block 62 is the battery SOC. The battery SOC is compared to a predetermined battery state of charge (S1). Specifically, it is determined whether the battery SOC is greater than the predetermined battery state of charge (S1). This again helps to ensure that false positives will not occur when determining the end of life of the battery 46. For example, if the power output by the battery is less than P1, it may be a result of the battery SOC being too low, rather than the battery 46 being at or near its end of life. The value of S1 can be chosen as desired, with higher values decreasing the likelihood of a false positive, but increasing the likelihood of a false negative. For the battery 46 shown in FIG. 1, a value of 40% has been found to be effective for S1.

Finally, as shown in decision block 62, a temperature of the battery 46 is determined to see whether it is within a predetermined battery temperature range. As shown in decision block 62, it is determined whether the battery temperature (TEMP.) is between two predetermined temperatures (T1) and (T2). Examining this battery condition can also help to avoid false positives, in that a lower than expected battery power output may be the result of extreme temperatures. Therefore, although T1 and T2 can be chosen as desired, values of 20° C. and 30° C. have been found to be effective to avoid false positives for the battery 46 shown in FIG. 1.

As shown in FIG. 2, each of the battery conditions examined have to match their corresponding predetermined battery condition, or the method loops back to block 60. Of course, the present invention may utilize fewer battery conditions, or more battery conditions, then are shown at decision block 62. Moreover, the logic for implementing the battery management method does not need to require each of the battery conditions to match its predetermined corresponding battery condition in order for the method to move on. Rather, it may be required that a single battery condition be met, or that certain combinations of battery conditions be met before the method advances to the next step.

The criteria examined in decision block 62 may be generally referred to as end of life criteria for the battery 46. For example, if, at decision block 62, it is determined that the battery 46 cannot deliver power that is at least at the level of P1 for time (t1), and each of the battery conditions determined matches its corresponding predetermined battery condition, it may mean that the battery 46 is at its end of life, and the method advances to step 64. At step 64, a counter is incremented to indicate that all of the criteria at decision block 62 have been met. It is worth noting that even though the end of life criteria for the battery 46 have all been met, the battery end of life is not indicated until at least one additional step is performed. At decision block 66, it is determined whether the counter is greater than a predetermined value (F1).

As discussed more fully below, examining the counter value is a way of determining a relative time of occurrence for a past rebalance of the battery 46. Specifically, the counter value will provide an indication of whether at least one rebalance condition is met, including whether the battery 46 was rebalanced within a second predetermined time period (t2), and whether it was rebalanced within some time period prior to the most recent rebalance. Using this counter is another way to help to ensure that an end of life determination is not made prematurely. Specifically, in the method of the present invention shown in FIG. 2, the battery 46 will be rebalanced twice within a certain time period before an end of life determination is made. Therefore, the value of F1 in decision block 66, is set equal to 2. Of course, different values can be used for F1, depending on how many times it is desired to have the battery 46 rebalanced prior to indicating an end of life.

If, at decision block 66, it is determined that the value of the counter is not greater than F1, the method advances to step 68, where the battery 46 is rebalanced. As described above, the rebalance of the battery 46 may be performed in accordance with any method effective to substantially equalize the SOC of each of the cells 47 in the battery 46. After the rebalance at step 68, the same determinations that were made at decision block 62 are now made at decision block 70.

If any one of the criteria listed at decision block 70 are not met, the method advances to step 72, where the battery 46 is declared to be "good", and the counter that was incremented at step 64 is now cleared. The method then moves back to the beginning at step 60. Although not specifically shown in FIG. 2, the method can exit to block 72 any time the battery 46 provides a power output substantially greater than P1. If, however, all of the criteria given in decision block 70 are met, the method advances to decision block 74, where another determination is made. It is worth noting that similar to the logic used at decision block 62, the logic at decision block 70 can be set up so that more or fewer criteria are examined, and also, so that not all of the criteria must be met prior to advancing to the next step. Moreover, although the criteria at decision block 62 and decision block 70 are the same, this is not a requirement.

At decision block 74, a determination is made as to whether the time since the last rebalance is greater than the second predetermined time period (t2). The value of t2 can be set as desired; however, a value of 30 days has been found to be effective for the battery 46 shown in FIG. 1. Thirty days is a small enough time period to avoid most or all false positives, but is still large enough to avoid false negatives.

If, at decision block 74, it is determined that the time since the last rebalance is greater than t2, the method loops back to step 72, where the battery 46 is declared "good", and the counter value is cleared. If, however, it is determined at decision block 74 that the time since the last rebalance is not greater than t2, the method loops back to the beginning at step 60. The method then goes back to step 62, and if all of the criteria are met, the counter is again incremented at step 64, and the counter value is determined at decision block 66. As can readily be determined from the flowchart 58 shown in FIG. 2, the value of the counter provides an indication of the relative time of occurrence for past battery rebalances.

In the case where F1 is set to 2, the method will advance to step 76 to indicate the end of life for the battery 46 only occur if the battery 46 has been rebalanced within the last 30 days, and rebalanced within 30 days prior to the most recent rebalance. This helps to ensure that the end of life indication at step 76 will not occur prematurely, and that false positives will be avoided. Of course, different values can be used for F1, including a value of zero. This would provide for an end of life indication any time the end of life criteria for the battery 46 were met, and it was determined that a battery rebalance had occurred within the last 30 days (or whatever other value is used for t2). When the battery end of life indication is made at step 76, the information can be communicated to a vehicle operator, via an audio, visual, or other type of indicator so that the appropriate measures could be taken. Once the battery end of life indication is made at step 76, the entire process stops at step 78.

While the best mode for carrying out the invention has been described in detail, those familiar with the art to which this invention relates will recognize various alternative designs and embodiments for practicing the invention as defined by the following claims.

What is claimed is:

1. A method for operating a battery having a plurality of battery cells, the method comprising:
   determining an output from the battery;
   determining at least one battery condition;
   determining a relative time of occurrence for at least one past rebalance of the battery; and
   rebalancing the battery when the output from the battery is less than a predetermined battery output for a first predetermined time period, the at least one battery condition matches a corresponding predetermined battery condition, and no rebalance has occurred for at least a second predetermined time period.

2. The method of claim 1, further comprising indicating an end of life for the battery when the output from the battery is less than the predetermined battery output for the first predetermined time period, the at least one battery condition matches a corresponding predetermined battery condition, and at least one rebalance condition is met, including at least one rebalance having occurred within the second predetermined time period.

3. The method of claim 2, wherein the at least one rebalance condition is met when one rebalance has occurred within the second predetermined time period, and another rebalance has occurred within a third predetermined time period.

4. The method of claim 3, further comprising:
   rebalancing the battery when the output from the battery is less than the predetermined battery output for the first predetermined time period, the at least one battery condition matches a corresponding predetermined battery condition, no more than one rebalance has occurred within the second predetermined time period, and no rebalance has occurred within the third predetermined time period.

5. The method of claim 1, wherein the output from the battery is a battery power.

6. The method of claim 5, wherein the at least one battery condition matches a corresponding predetermined condition when at least one of the following occurs: a voltage of the battery is less than a predetermined battery voltage, a state of charge of the battery is at least a predetermined battery state of charge, or a temperature of the battery is within a predetermined battery temperature range.

7. A method for operating a battery having a plurality of battery cells, the method comprising:

determining when end of life criteria for the battery are met;

incrementing a counter when it is determined that the end of life criteria for the battery are met;

rebalancing the battery when it is determined that the end of life criteria for the battery are met and the counter is not greater than a predetermined value; and indicating an end of life of the battery when it is determined that the end of life criteria for the battery are met and the counter is greater than the predetermined value.

8. The method of claim 7, further comprising:

resetting the counter when it is determined that the end of life criteria for the battery are met and a time since the last battery rebalance is at least a predetermined time.

9. The method of claim 8, wherein determining when the end of life criteria for the battery are met includes determining when an output from the battery is less than a predetermined battery output for a first predetermined time period, and determining when at least one battery condition matches a corresponding predetermined battery condition.

10. The method of claim 9, wherein the output from the battery is a battery power.

11. The method of claim 10, wherein the at least one battery condition matches a corresponding predetermined condition when at least one of the following occurs: a voltage of the battery is less than a predetermined battery voltage, a state of charge of the battery is at least a predetermined battery state of charge, or a temperature of the battery is within a predetermined battery temperature range.

12. The method of claim 11, wherein the battery is rebalanced when it is determined that the end of life criteria for the battery are met and the counter is not greater than two.

13. The method of claim 11, wherein the counter is reset when it is determined that the end of life criteria for the battery are met and a time since the last battery rebalance is at least thirty days.

14. A vehicle, comprising:

an electric machine;

a battery operable to provide power to the electric machine, the battery having a plurality of battery cells, the battery being subject to periodic rebalancing to substantially equalize the state of charge of each of the cells; and a control system including at least one controller, the control system being in communication with the battery and configured to:

determine when end of life criteria for the battery are met, increment a counter when the end of life criteria for the battery are met, rebalance the battery when the control system determines that the end of life criteria for the battery are met and the counter is not greater than a predetermined value, and indicate an end of life of the battery when the control system determines that the end of life criteria for the battery are met and the counter is greater than the predetermined value.

15. The vehicle of claim 14, wherein the control system is further configured to reset the counter when the control system determines that the end of life criteria for the battery are met and a time since the last battery rebalance is at least a predetermined time.

16. The vehicle of claim 15, wherein the control system is configured to determine when the end of life criteria for the battery are met by at least determining when an output from the battery is less than a predetermined battery output for a first predetermined time period, and determining when at least one battery condition matches a corresponding predetermined battery condition.

17. The vehicle of claim 16, wherein the output from the battery determined by the control system is a battery power.

18. The vehicle of claim 17, wherein the at least one battery condition matches a corresponding predetermined condition when at least one of the following occurs: a voltage of the battery is less than a predetermined battery voltage, a state of charge of the battery is at least a predetermined battery state of charge, or a temperature of the battery is within a predetermined battery temperature range.

19. The vehicle of claim 18, wherein the control system is configured to rebalance the battery when the control system determines that the end of life criteria for the battery are met and the counter is not greater than two.

20. The vehicle of claim 19, wherein the control system is configured to reset the counter when it is determined that the end of life criteria for the battery are met and a time since the last battery rebalance is at least thirty days.

* * * * *